(12) United States Patent
Leita et al.

(10) Patent No.: US 9,161,249 B1
(45) Date of Patent: Oct. 13, 2015

(54) SYSTEMS AND METHODS FOR PERFORMING INTERNET SITE SECURITY ANALYSES

(75) Inventors: Corrado Leita, Juan les Pins (FR); Marc Dacier, Mouans Sartoux (BE)

(73) Assignee: Symantec Corporation, Mountain View, CA (US)

( * ) Notice: Subject to any disclaimer, the term of this patent is extended or adjusted under 35 U.S.C. 154(b) by 1030 days.

(21) Appl. No.: 13/177,891

(22) Filed: Jul. 7, 2011

(51) Int. Cl.
G06F 11/00 (2006.01)
H04L 12/56 (2006.01)
G06F 15/16 (2006.01)
H04W 24/08 (2009.01)

(52) U.S. Cl.
CPC ..................... *H04W 24/08* (2013.01)

(58) Field of Classification Search
CPC .............. H04L 69/329; H04L 63/0281; H04L 12/4633; H04L 63/0272; H04L 63/1433; H04L 63/1466; H04L 29/12216; H04W 24/08; H04W 48/16; G06F 21/50; Y04S 40/24
USPC ..................................................... 726/24, 25
See application file for complete search history.

(56) References Cited

U.S. PATENT DOCUMENTS

| | | | | |
|---|---|---|---|---|
| 6,324,648 | B1 * | 11/2001 | Grantges, Jr. .................... | 726/12 |
| 6,502,106 | B1 * | 12/2002 | Gampper et al. ............. | 709/202 |
| 6,996,845 | B1 * | 2/2006 | Hurst et al. ...................... | 726/25 |
| 7,444,680 | B2 * | 10/2008 | Hurst et al. ...................... | 726/25 |
| 7,512,953 | B1 * | 3/2009 | Sabev ............................ | 719/316 |
| 7,841,008 | B1 * | 11/2010 | Cole et al. ........................ | 726/25 |
| 8,019,689 | B1 * | 9/2011 | Nachenberg .................... | 705/64 |
| 8,090,852 | B2 * | 1/2012 | Ianchici et al. ................ | 709/229 |
| 8,281,401 | B2 * | 10/2012 | Pennington et al. ............ | 726/25 |
| 8,856,869 | B1 * | 10/2014 | Brinskelle ......................... | 726/2 |
| 2002/0065946 | A1 * | 5/2002 | Narayan ........................ | 709/315 |
| 2003/0005299 | A1 * | 1/2003 | Xia et al. ....................... | 713/171 |
| 2003/0033520 | A1 * | 2/2003 | Peiffer et al. .................. | 713/153 |
| 2004/0002903 | A1 * | 1/2004 | Stolfo et al. ..................... | 705/26 |
| 2004/0073634 | A1 * | 4/2004 | Haghpassand ................. | 709/220 |
| 2004/0133794 | A1 * | 7/2004 | Kocher et al. ................. | 713/193 |
| 2005/0052677 | A1 * | 3/2005 | Maruyama ................... | 358/1.13 |
| 2006/0075221 | A1 * | 4/2006 | Moore et al. .................. | 713/156 |
| 2006/0212941 | A1 * | 9/2006 | Bronnikov et al. ............. | 726/24 |

(Continued)

OTHER PUBLICATIONS

Kritikopoulos, Apostolos; CrawlWave: A Distributed Crawler; Athens University of Economics and Business, Dept. of Computer Science.

(Continued)

*Primary Examiner* — Arvin Eskandarnia
*Assistant Examiner* — Margishi Desai
(74) *Attorney, Agent, or Firm* — ALG Intellectual Property, LLC

(57) ABSTRACT

A computer-implemented method for performing Internet site security analyzes may include (1) identifying a plurality of clients, each client within the plurality of clients connecting to the Internet from a different Internet Protocol address, (2) identifying a plurality of Internet sites targeted for a security assessment, and then, for each Internet site within the plurality of Internet sites, (3) selecting at least one client from the plurality of clients to use as a proxy for communicating with the Internet site, (4) communicating with the Internet site, using the client as a proxy, to gather information for a security analysis of the Internet site, and (5) performing the security analysis of the Internet site based at least in part on the gathered information. Various other methods, systems, and computer-readable media are also disclosed.

20 Claims, 6 Drawing Sheets

(56) References Cited

U.S. PATENT DOCUMENTS

| | | | |
|---|---|---|---|
| 2007/0061877 A1* | 3/2007 | Sima et al. | 726/12 |
| 2007/0186285 A1* | 8/2007 | Hurst et al. | 726/25 |
| 2008/0189400 A1* | 8/2008 | Norrie et al. | 709/223 |
| 2008/0244074 A1* | 10/2008 | Baccas et al. | 709/227 |
| 2008/0282338 A1* | 11/2008 | Beer | 726/12 |
| 2008/0291030 A1* | 11/2008 | Pape et al. | 340/573.3 |
| 2009/0172395 A1* | 7/2009 | Chen et al. | 713/168 |
| 2009/0178132 A1* | 7/2009 | Hudis et al. | 726/12 |
| 2010/0205657 A1* | 8/2010 | Manring et al. | 726/5 |
| 2010/0205665 A1* | 8/2010 | Komili et al. | 726/12 |
| 2010/0226313 A1* | 9/2010 | Sugimoto et al. | 370/328 |
| 2010/0242082 A1* | 9/2010 | Keene et al. | 726/1 |
| 2011/0231478 A1* | 9/2011 | Wheeler et al. | 709/203 |
| 2012/0117650 A1* | 5/2012 | Nachenberg | 726/24 |

OTHER PUBLICATIONS

Boldi, Paolo; UbiCrawler: A Scalable Fully Distributed Web Crawler; University of Iowa, Dept. of Computer Science.

The Honeynet Project; HoneyC; https://projects.honeynet.org/honeyc; Taken from site on Mar. 21, 2011.

GHH—The Goodie Hack Honeypot; What is GHH?; http://ghh.sourceforge.net/; Feb. 13, 2005.

Capture-HPC; Capture-HPC Client Honeypot / Honeyclient; https://projects.honeynet.org/capture-hpc; Sep. 2, 2008.

Wang, Kathy; OWASP Conference; Using HoneyClients for Detection and Response Against New Attacks; MITRE Corporation; Sep. 6, 2007.

The Honey Spider Network; Welcome to the HoneySpider Network Project; http://www.honeyspider.net; Jun. 15, 2009.

Kijewski, Piotr; The HoneySpider Network—Fighting Client—Side Threats.

Hes, Radek; The Capture-HPC Client Architecture; NZ Chapter, Capture-HPC Alliance, Second Revision, Aug. 2010.

Jiang, Xuxian et al., "Collapsar: A VM-Based Honeyfarm and Reverse Honeyfarm Architecture for Network Attack Capture and Detention", Report No. 06-001, (Jan. 2006).

* cited by examiner

SYSTEMS AND METHODS FOR PERFORMING INTERNET SITE SECURITY ANALYSES

BACKGROUND

In recent years, the Internet has become a major vector for malware propagation. Due to the increasing complexity of web browsers and associated plugins, a considerable number of vulnerabilities have been discovered and are currently being leveraged by attackers to propagate malware samples that bypass standard security measures such as firewalls, which are generally designed to block inbound traffic but allow clients to freely interact with Internet sites.

In order to identify malicious Internet sites, security vendors may use web crawlers and/or other automated bots to inspect, interact with, and analyze Internet sites. Unfortunately, an attacker may escape detection by hiding malicious behavior from web crawlers. For example, an attacker may use a blacklist to block requests from and/or alter behavior for IP addresses associated with security vendors and/or security researchers. Attackers may even trade and circulate such blacklists in order to create nearly complete blacklists. Accordingly, the instant disclosure identifies a need for additional and improved systems and methods for performing Internet site security analyses.

SUMMARY

As will be described in greater detail below, the instant disclosure generally relates to systems and methods for performing Internet site security analyses. For example, a computer-implemented method for performing Internet site security analyses may include (1) identifying a plurality of clients, with each client within the plurality of clients connecting to the Internet from a different Internet Protocol address, (2) identifying a plurality of Internet sites targeted for a security assessment, and then, for each Internet site within the plurality of Internet sites, (3) selecting at least one client from the plurality of clients to use as a proxy for communicating with the Internet site, (4) communicating with the Internet site, using the client as a proxy, to gather information for a security analysis of the Internet site, and (5) performing the security analysis of the Internet site based at least in part on the gathered information.

In one example, a system for performing the above-described method may include one or more processors configured to execute an identification module, a selection module, a gathering module, and an analysis module. The identification module may be programmed to (1) identify a plurality of clients, with each client within the plurality of clients connecting to the Internet from a different Internet Protocol address, and (2) identify a plurality of Internet sites targeted for a security assessment, and, for each Internet site within the plurality of Internet sites. The selection module may be programmed to select at least one client from the plurality of clients to use as a proxy for communicating with the Internet site. The gathering module may be programmed to communicate with the Internet site, using the client as a proxy, to gather information for a security analysis of the Internet site, and the analysis module may be programmed to perform the security analysis of the Internet site based at least in part on the gathered information.

In some examples, each client within the plurality of clients may connect to the Internet not only from a different Internet Protocol address, but from a different Internet Protocol address block.

The selection module may select the client in any of a variety of ways. For example, the selection module may select the client based on the public Internet Protocol address of the client. In some examples, the selection module may select the client to test the Internet site for a response differentiated by Internet Protocol addresses. In another example, the selection module may select the client to prevent detection as a security vendor by the Internet site. Additionally or alternatively, the selection module may select the client based on a geographical region of the client ascertainable by the Internet site.

The gathering module may use the client as a proxy in any of a variety of contexts. For example, the gathering module may use the client as a proxy by (1) receiving a communication from the client to initiate a tunneling protocol and then (2) communicating with the client via the tunneling protocol. In some examples, the gathering module may use the client as a proxy by communicating with a proxy agent installed on the client as part of an endpoint security software installation on the client. Additionally or alternatively, the gathering module may use the client as a proxy by identifying a user-submitted agreement to allow a security vendor to use the client as a proxy for communications with Internet sites targeted for security assessments.

As will be described in greater detail below, by leveraging a collection of clients (e.g., clients with a security endpoint installation) with a range of different Internet Protocol addresses for use as proxies, the systems and methods described herein may gather information from potentially malicious Internet sites without providing the Internet sites with a centralized Internet Protocol address block. Accordingly, these systems and methods may reduce the potential for malicious Internet sites to recognize a security crawling effort as such, thereby preventing malicious Internet sites from obscuring relevant information from security vendors and researchers. Furthermore, by only using these clients as proxies (i.e., performing analysis on gathered information on a central server), the systems and methods described herein may shield the clients from security vulnerabilities associated with interacting with malicious Internet sites and may reduce the computational burden placed on the clients.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
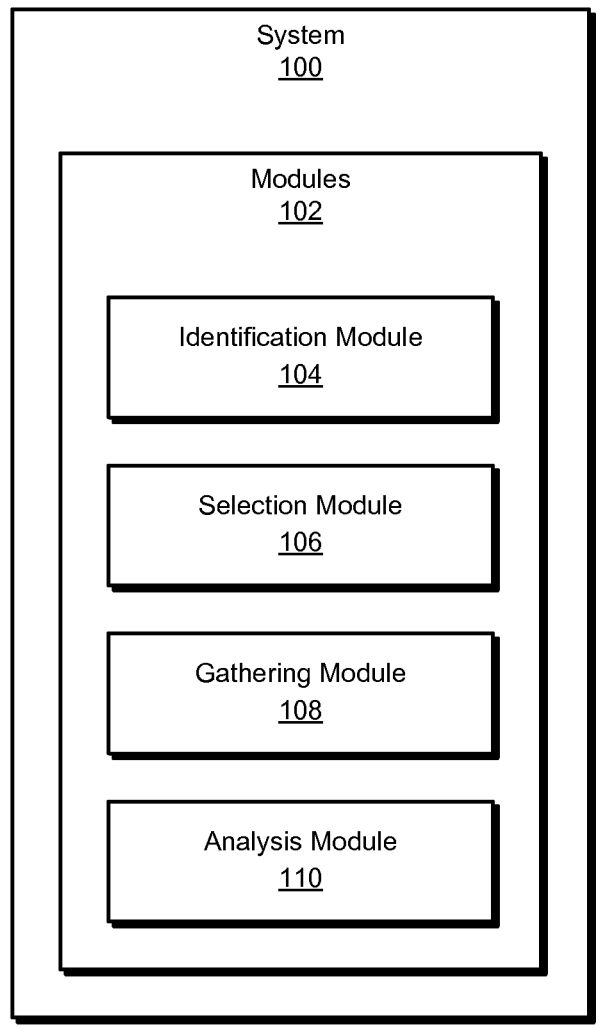
FIG. 1 is a block diagram of an exemplary system for performing Internet site security analyses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
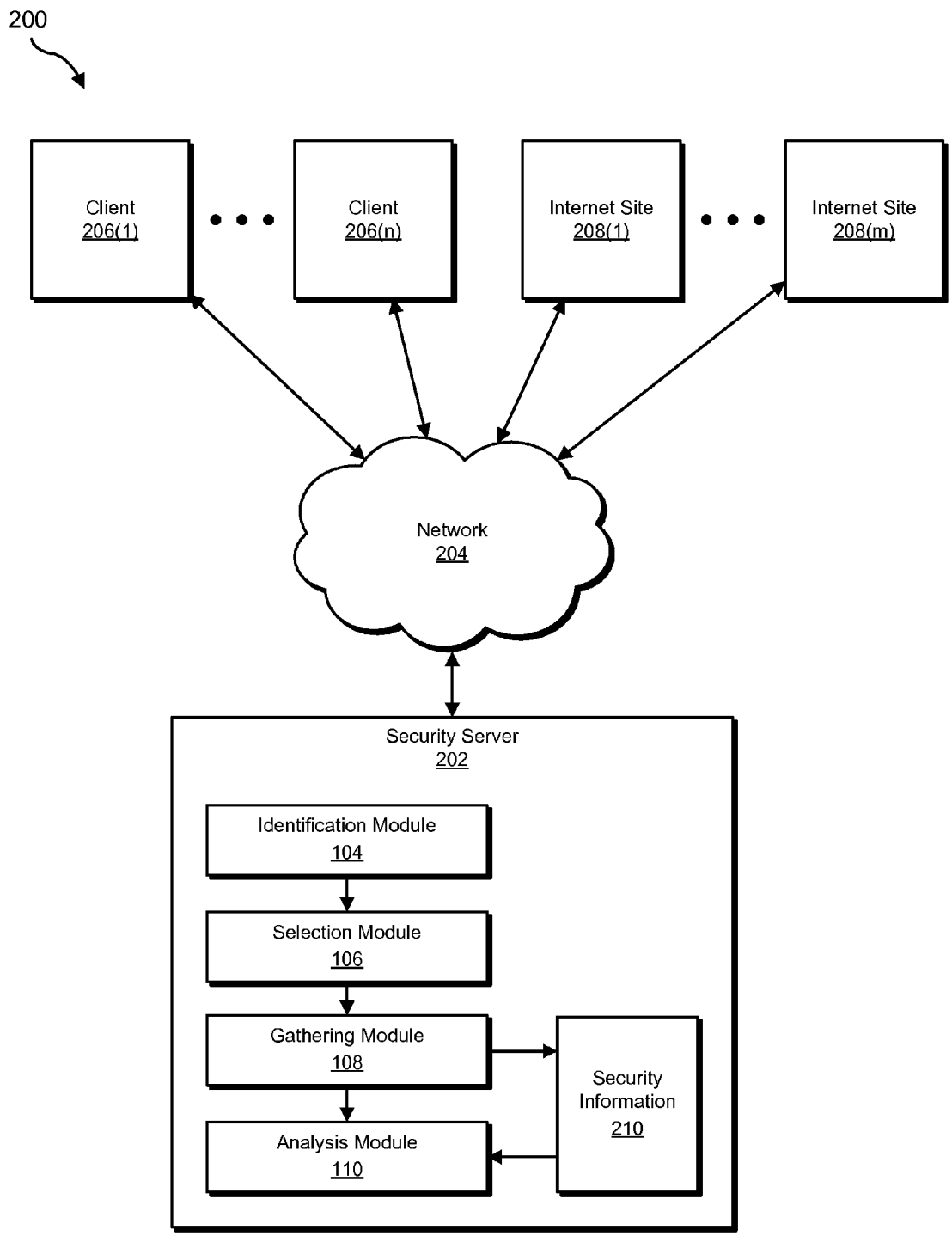
FIG. 2 is a block diagram of an exemplary system for performing Internet site security analyses.
Figure 3:
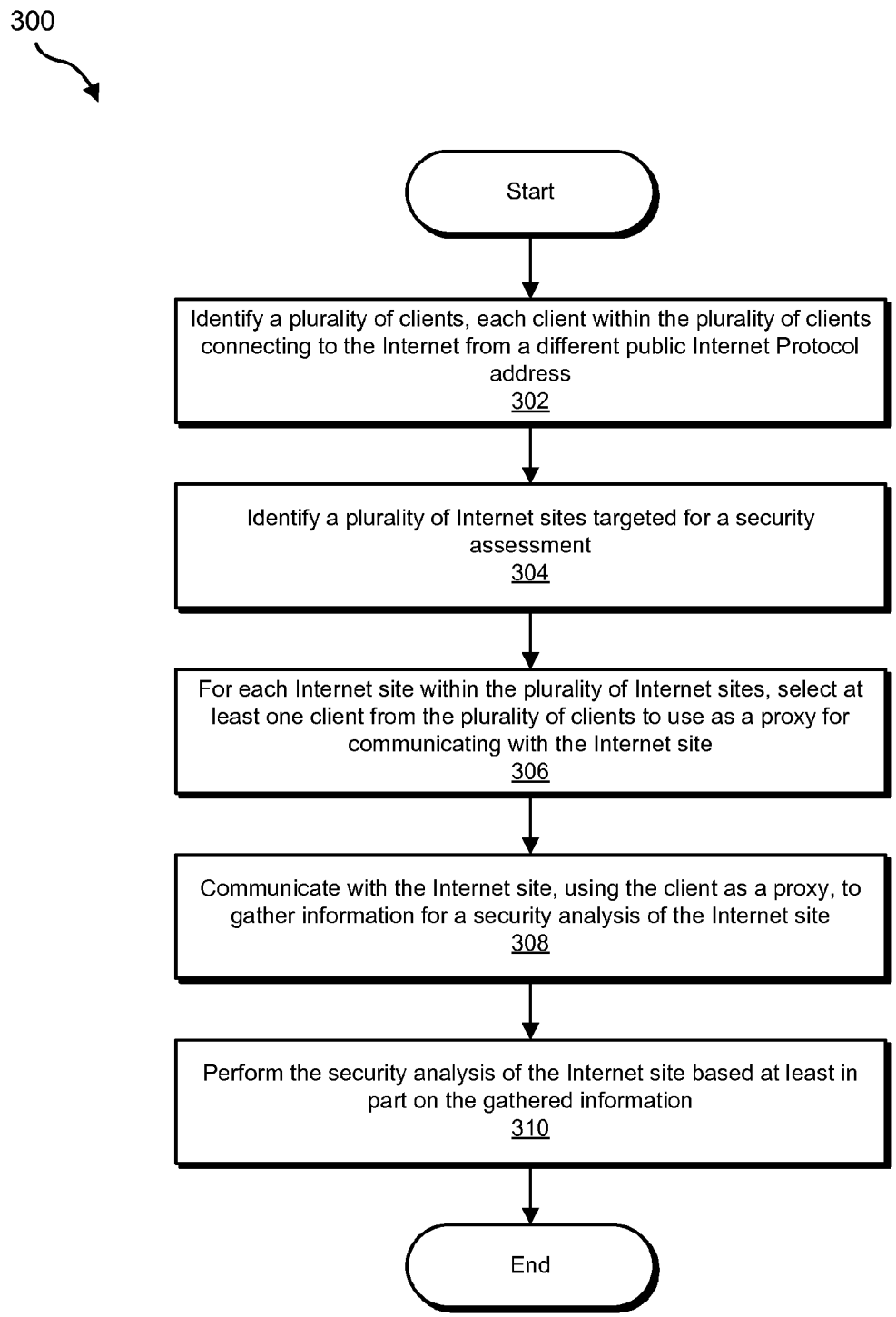
FIG. 3 is a flow diagram of an exemplary method for performing Internet site security analyses.
Figure 4:
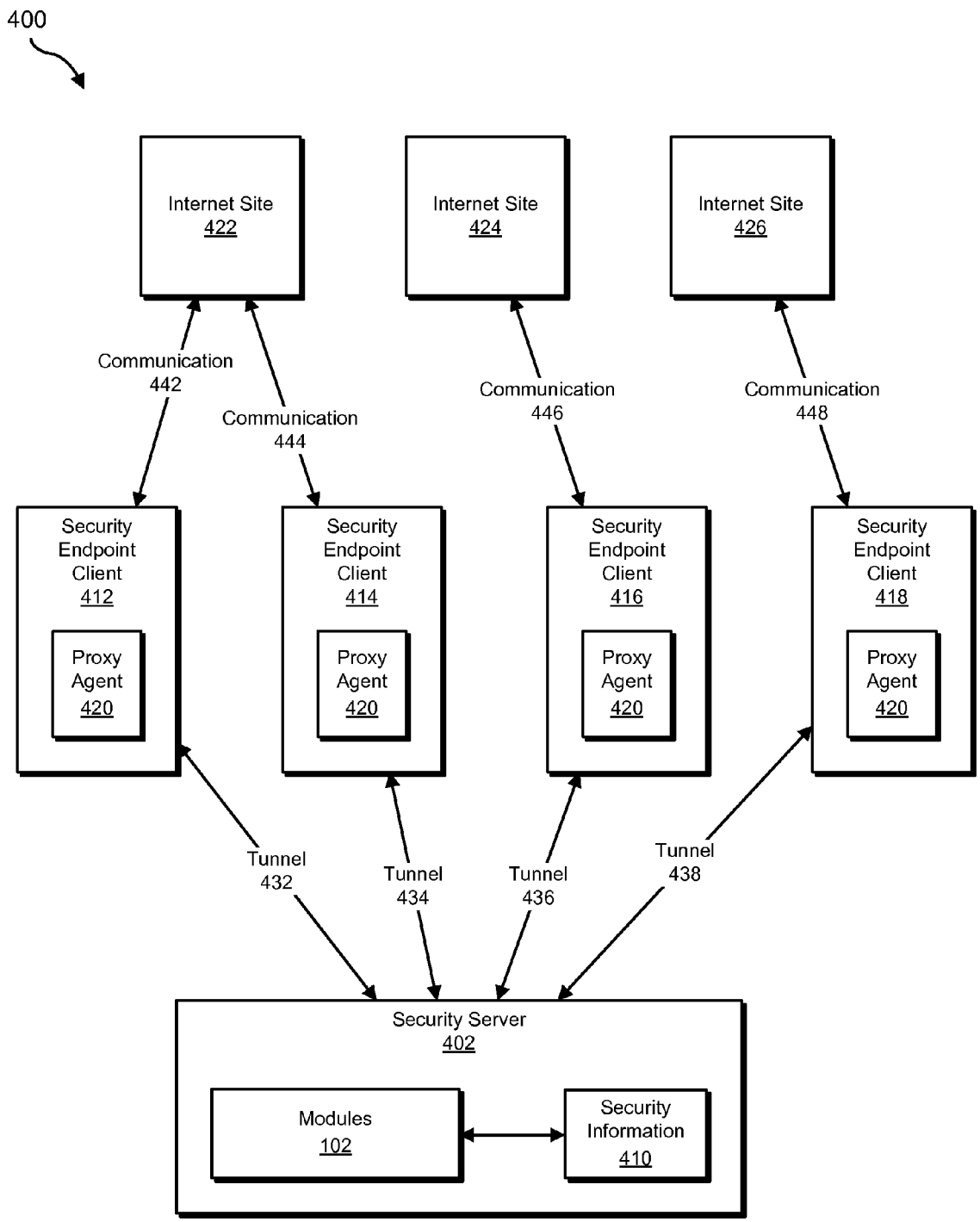
FIG. 4 is a block diagram of an exemplary system for performing Internet site security analyses.

The following will provide, with reference to FIGS. 1, 2, and 4, detailed descriptions of exemplary systems for performing Internet site security analyses. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing Internet site security analyses. As illustrated in this figure, exemplary system 100 may include one or more modules 102 for performing one or more tasks. For example, and as will be explained in greater detail below, exemplary system 100 may include an identification module 104 programmed to (1) identify a plurality of clients, with each client within the plurality of clients connecting to the Internet from a different Internet Protocol address, and (2) identify a plurality of Internet sites targeted for a security assessment, and, for each Internet within the plurality of Internet sites. Exemplary system 100 may also include a selection module 106 programmed to select at least one client from the plurality of clients to use as a proxy for communicating with the Internet site. Exemplary system 100 may additionally include a gathering module 108 programmed to communicate with the Internet site, using the client as a proxy, to gather information for a security analysis of the Internet site.

In addition, and as will be described in greater detail below, exemplary system 100 may include an analysis module 110 programmed to perform the security analysis of the Internet site based at least in part on the gathered information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., security server 202 and/or clients 206(1)-(n)), the devices illustrated in FIG. 4 (e.g., security server 402 and/or security endpoint clients 412, 414, 416, and 418), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a security server 202 in communication with clients 206(1)-(n) via a network 204. In one embodiment, and as will be described in greater detail below, modules 102 from FIG. 1 may program security server 202 to perform security analyses on Internet sites 208(1)-(m) by (1) identifying a plurality of clients, with each client within the plurality of clients 206(1)-(n) connecting to the Internet from a different Internet Protocol address, (2) identifying a plurality of Internet sites 208(1)-(m) targeted for a security assessment, and then, for each Internet site within Internet sites 208(1)-(m), (3) selecting at least one client from clients 206(1)-(n) to use as a proxy for communicating with the Internet site (e.g., selecting client 206(1) to use as a proxy for communicating with Internet site 208(1)), (4) communicating with the Internet site, using the client as a proxy, to gather information for a security analysis of the Internet site (e.g., communicating with Internet site 208(1) using client 206(1) as a proxy to gather security information 210 for a security analysis of Internet site 208(1)), and (5) performing the security analysis of the Internet site based at least in part on the gathered information.

Security server 202 generally represents any type or form of computing device capable of reading computer-executable instructions. In some examples, security server 202 may include a computing device configured for analyzing Internet sites. Examples of security server 202 include, without limitation, servers, desktops, laptops, embedded systems, combinations of one or more of the same, exemplary computing system 510 in FIG. 5, or any other suitable computing device.

Clients 206(1)-(n) generally represent any type or form of computing device that is capable of acting as a forwarding proxy. In some examples, clients 206(1)-(n) may represent computing devices configured with an endpoint security product. Examples of clients 206(1)-(n) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, the Internet, an intranet, a wide area network (WAN), a local area network (LAN), a personal area network (PAN), power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between security server 202 and clients 206(1)-(n). Additionally or alternatively, network 204 may facilitate communication between clients 206(1)-(n) and Internet sites 208(1)-(m).

FIG. 3 is a flow diagram of an exemplary computer-implemented method 300 for performing Internet site security analyses. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a plurality of clients, with each client within the plurality of clients connecting to the Internet from a different public Internet Protocol address.

For example, at step 302 identification module 104 may, as part of security server 202 in FIG. 2, identify clients 206(1)-(n).

As used herein, the phrase "public Internet Protocol address" generally refers to an Internet Protocol address associated with a client and used by a server (e.g., a server hosting an Internet site) to address responses to queries from the client. For example, a public Internet Protocol address may include an Internet Protocol address used for addressing communications on the Internet (i.e., as opposed to communications within a local and/or private network).

In some examples, each client within the plurality of clients may connect to the Internet from a different Internet Protocol address block. As used herein, the phrase "Internet Protocol address block" may refer to a collection of Internet Protocol addresses allocated to a single entity. For example, the phrase "Internet Protocol address block" may refer to a Class C address block (e.g., 198.51.100.0/24, including Internet Protocol addresses 198.51.100.0 to 198.51.100.255). Additionally or alternatively, the phrase "Internet Protocol address block" may refer to a collection of Internet Protocol addresses attributable to a single entity, either by standard or by implication (e.g., the proximity of two addresses implying single ownership, control, and/or use).

Identification module 104 may identify the plurality of clients in a variety of ways. For example, identification module 104 may access a database identifying clients with a security endpoint product installation and/or an opt-in agreement to participate in the methods described herein. In some examples, identification module 104 may identify the plurality of clients by identifying a larger group of clients, some of which may share a public Internet Protocol address and/or an Internet Protocol address block with one or more clients within the plurality of clients.

FIG. 4 illustrates an exemplary system 400 for performing Internet site security analyses. As shown in FIG. 4, exemplary system 400 may include a security server 402 configured with modules 102. Using FIG. 4 as an example of step 302, identification module 104 may, as part of security server 402, identify security endpoint clients 412, 414, 416, and 418.

At step 304, one or more of the systems described herein may identify a plurality of Internet sites targeted for a security assessment. For example, at step 304 identification module 104 may, as part of security server 202, identify Internet sites 208(1)-(m). Using FIG. 4 as an example, at step 304 identification module 104 may, as part of security server 402, identify Internet sites 422, 424, and 426.

As used herein, the phrase "security assessment" may refer to any method and/or process for determining the safety, maliciousness, and/or legitimacy of an Internet site. For example, a security assessment may determine whether an Internet site hosts and/or distributes malware, attempts to exploit a vulnerability of a client, and/or attempts a phishing attack.

Identification module 104 may perform step 304 in any suitable manner. For example, identification module 104 may access a database of suspected Internet sites. Additionally or alternatively, identification module 104 may identify Internet sites that were suspected as malicious, but could not be accessed directly from, or appeared legitimate when accessed directly from, an Internet protocol address associated with the Internet site.

At step 306, one or more of the systems described herein may, for each Internet site within the plurality of Internet sites, select at least one client from the plurality of clients to use as a proxy for communicating with the Internet site. For example, at step 306 selection module 106 may, as part of security server 202, identify Internet sites 208(1)-(m). Using FIG. 4 as an example, at step 306 selection module 106 may, as part of security server 402, identify Internet sites 422, 424, and 426.

As used herein, the term "proxy" may refer to a system that acts as a communication intermediary between computing systems on a network. For example, the term "proxy" may refer to a forward proxy. In some examples, a proxy may effectively hide the Internet Protocol address of a requesting client from a server by substituting the Internet Protocol address of the proxy in communications with the server. In some examples, the term "proxy" may refer to a system that only forwards data packets between a client and a server (e.g., without analyzing and/or manipulating the packets). As will be explained in greater detail below, in some examples, using a client as a proxy may entail communicating with a proxy agent on the client.

Selection module 106 may select the client to use a proxy in any of a variety of ways. For example, selection module 106 may select the client based on the public Internet Protocol address of the client. By selecting the client based on the public Internet Protocol address of the client, selection module 106 may choose what Internet Protocol address to expose to the Internet site. As will be explained in greater detail below, selecting the Internet Protocol address to expose to the Internet site may present a variety of advantages. In some examples, the selection module 106 may select the client to test for a response differentiated by Internet Protocol addresses. For example, selection module 106 may select the client in order to see how the Internet site responds to a request from the Internet Protocol address of the client. For example, selection module 106 may select a client with an Internet Protocol address in a country suspected of being targeted for attacks and/or censorship. In some examples, selection module 106 may select one or more additional clients to act as a control. For example, selection module 106 may select one or more clients with Internet Protocol addresses expected to yield default and/or non-customized responses from the Internet site.

In some examples, selection module 106 may select the client to prevent detection as a security vendor by the Internet site. For example, selection module 106 may select the client because the client does not share a public Internet Protocol address and/or an Internet Protocol address block with a known security vendor and/or security research institution. Accordingly, the Internet site may be unable to block requests from and/or tailor requests for the security vendor and/or security research institution based on the Internet Protocol address of the client.

Selection module 106 may also select the client based on a geographical region of the client ascertainable by the Internet site. For example, selection module 106 may choose a client with a public Internet Protocol address corresponding to a geographical region. The client may then present requests to the Internet site as coming from the chosen geographical region.

In some examples, selection module 106 may also use other criteria for selecting the client. For example, selection module 106 may identify one or more policies and/or settings determining acceptable usage patterns for using the client as a proxy. For example, selection module 106 may select the client in part based on the public Internet Protocol address of the client and in part based on the bandwidth impact on the client and/or the total amount of proxy traffic already directed to the client. In some examples, an owner of the client may agree to the use of the client for the methods described herein subject to bandwidth limits and/or traffic limits (e.g., the owner may agree to donate 1 megabyte per hour of network bandwidth to security research). Accordingly, selection module 106 may identify such limits and choose the client based on a projection and/or determination that the client may be used as a proxy without exceeding these limits.

At step 308, one or more of the systems described herein may communicate with the Internet site, using the client as a proxy, to gather information for a security analysis of the Internet site. For example, at step 308 gathering module 108 may, as part of security server 202, communicate with Internet site 208(1), using client 206(1) as a proxy, to gather security information 210. Using FIG. 4 as another example, at step 308 gathering module 108 may, as part of security server 402, communicate with Internet site 422 using security endpoint client 414 as a proxy to add to security information 410.

Gathering module 108 may use the client as a proxy in any of a variety of contexts. For example, gathering module 108 may receive a communication from the client to initiate a tunneling protocol. For example, gathering module 108 may receive a communication initiating a Transmission Control Protocol connection encrypted through a Secure Sockets Layer. Using FIG. 4 as an example, gathering module 108 may receive a communication from security endpoint client 414 to create a tunnel 434 between security endpoint client 414 and security server 402. Likewise, gathering module 108 at various times may receive communications from security endpoint clients 412, 416, and 418 to create tunnels 432, 436, and 438, respectively. By allowing the client to establish initiate the tunnel, gathering module 108 may securely communicate with the client while bypassing any firewalls and/or Network Address Translation devices between the client and a security server hosting gathering module 108. After the tunnel is established, gathering module 108 may communicate with the client via the tunneling protocol to use the client as a proxy.

In some examples, gathering module 108 may use the client as a proxy by communicating with a proxy agent installed on the client as part of an endpoint security software installation on the client. For example, a user may have previously installed endpoint security software (e.g., anti-virus software) on the client. As part of the installation, the user may have also installed the proxy agent. In another example, the user may have installed the proxy agent at a later time via the endpoint security software (e.g., the endpoint security software may prompt the user to install the proxy agent and/or to agree to allow the client to serve as a proxy for security research). The proxy agent may include any agent and/or module configured to provide proxy functionality.

Using FIG. 4 as an example, each of security endpoint clients 412, 414, 416, and 418 may include a proxy agent 420. Gathering module 108 may, as a part of security server 402, use security endpoint client 414 as a proxy by communicating with proxy agent 420 installed on security endpoint client 414 as part of an endpoint security software installation. For example, communications transmitted via tunnel 434 from security server 402 to security endpoint client 414 may be forwarded by proxy agent 420 to Internet site 422 as part of communication 444. Additionally, communications transmitted via Internet site 422 to security endpoint client 414 as part of communication 444 may be forwarded by proxy agent 420 via tunnel 434 to security server 402. Likewise, communication 442, 446, and 448 may represent proxy communications received through and forwarded back through tunnels 432, 436, and 438, respectively.

In some examples, as part of using the client as a proxy, gathering module 108 may identify a user-submitted agreement to allow a security vendor to use the client as a proxy for communications with Internet sites targeted for security assessments. Using FIG. 4 as an example, gathering module 108 may identify an agreement from security endpoint client 414 providing permission for a security vendor controlling security server 402 to use security endpoint client 414 as a proxy.

At step 310, one or more of the systems described herein may perform the security analysis of the Internet site based at least in part on the gathered information. For example, at step 310 analysis module 110 may, as part of security server 202, perform the security analysis of Internet site 208(1) based at least in part on security information 210. Using FIG. 4 as another example, at step 310 analysis module 110 may, as part of security server 402, perform the security analysis of Internet site 422 based at least in part on the portion of security information 410 gathered from Internet site 422 via security endpoint client 414.

Analysis module 110 may perform step 310 in any suitable manner. For example, analysis module 110 may scan data received from the Internet site for malware. Additionally or alternatively, analysis module 110 may analyze patterns in the communications between the client and the Internet site for indications of known security exploits. Generally, analysis module 110 may use any suitable methods for analyzing data to identify potential attacks and/or security problems.

In some examples, analysis module 110 may analyze information gathered from the Internet site via multiple clients. For example, the systems described herein may use multiple clients as proxies to gather differentiated information from the Internet site. Using FIG. 4 as an example, security server 402 may gather security information about Internet site 422 through security endpoint client 412 and security endpoint client 414. Analysis module 110 may then compare the information gathered by each client as part of analyzing Internet site 422. For example, if security endpoint clients 412 and 414 are in different geographical regions, but Internet site 422 appeared to only attempt an attack on security endpoint client 414, analysis module 110 may determine that Internet site 422 is conducting a regional attack. Additionally or alternatively, analysis module 110 may determine that a suspicious transaction attempted by Internet site 422 on security endpoint client 414 is more suspect because Internet site 422 did not attempt the same on security endpoint client 412.

Upon completion of step 310, exemplary method 300 in FIG. 3 may terminate.

As detailed above, by leveraging a collection of clients (e.g., clients with a security endpoint installation) with a range of different Internet Protocol addresses for use as proxies, the systems and methods described herein may gather information from potentially malicious Internet sites without providing the Internet sites with a centralized Internet Protocol address block. Accordingly, these systems and methods may reduce the potential for malicious Internet sites to recognize a security crawling effort as such, thereby preventing malicious Internet sites from obscuring relevant information from security vendors and researchers. Furthermore, by only using these clients as proxies (i.e., performing analysis on gathered information on a central server), the systems and methods described herein may shield the clients from security vulnerabilities associated with interacting with malicious Internet sites and may reduce the computational burden placed on the clients.

Figure 5:
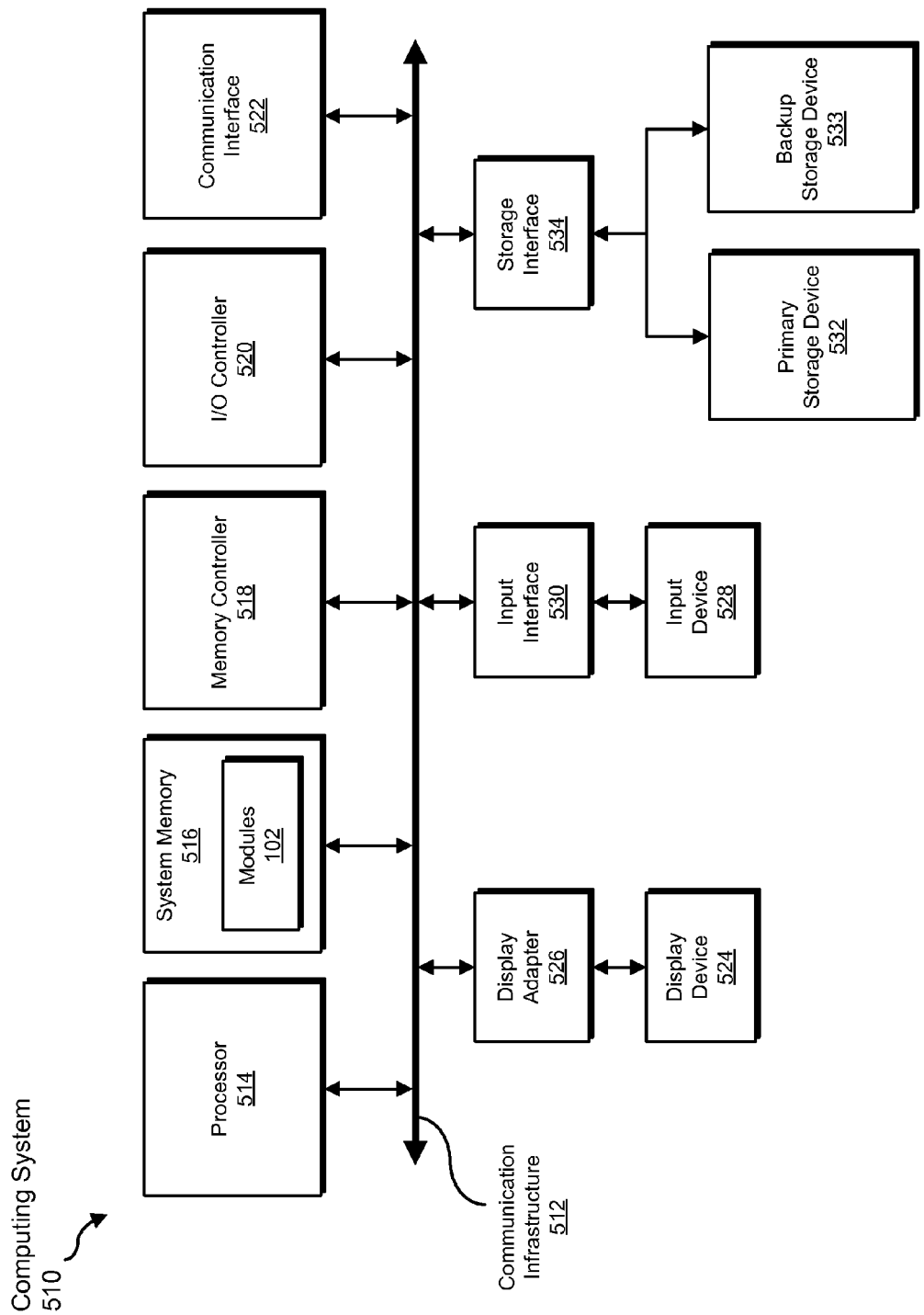
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, selecting, communicating, using, gathering, receiving, and/or performing claims steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, selecting, communicating, using, gathering, receiving, and/or performing claims.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, selecting, communicating, using, gathering, receiving, and/or performing claims steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, selecting, communicating, using, gathering, receiving, and/or performing claims steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, selecting, communicating, using, gathering, receiving, and/or performing claims steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, selecting, communicating, using, gathering, receiving, and/or performing claims steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
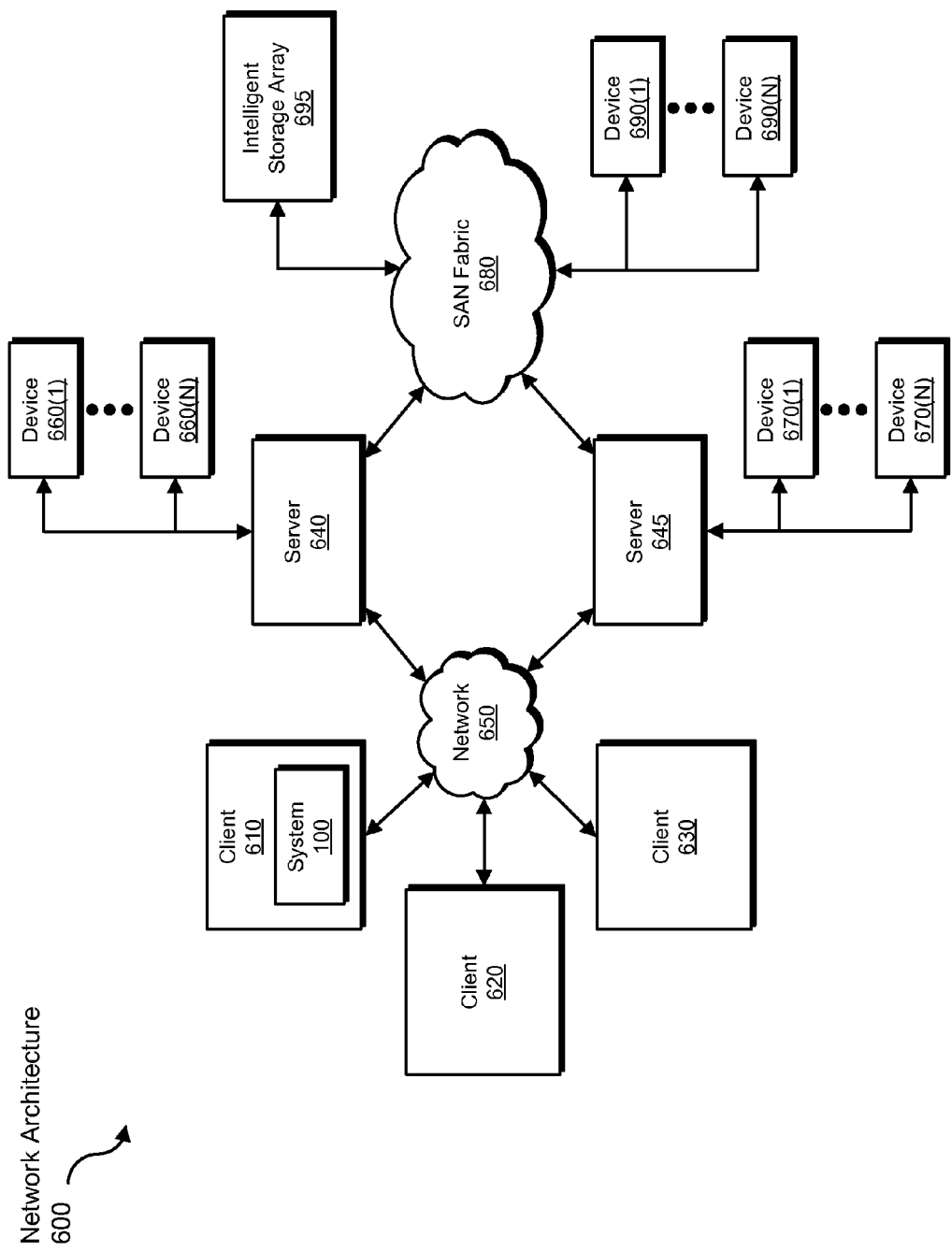
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, selecting, communicating, using, gathering, receiving, and/or performing claims steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for performing Internet site security analyses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a security server into a security server capable of leveraging clients for distributed security information gathering.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing Internet site security analyses, at least a portion of the method being performed by a computing device comprising at least one processor, the method comprising:
   identifying a plurality of clients, each client within the plurality of clients connecting to the Internet from a different public Internet Protocol address;
   identifying a plurality of potentially malicious Internet sites targeted for a security assessment;
   for each Internet site within the plurality of potentially malicious Internet sites:
      selecting at least one client from the plurality of clients to use as a proxy for communicating with the Internet site on behalf of a security assessor;
      communicating with the Internet site, using the client as a proxy, to gather information for a security analysis of the Internet site so that the Internet site is unable to block and/or tailor requests from the security assessor based on an Internet Protocol address of the client;
   performing the security analysis of the Internet site based at least in part on the gathered information.

2. The computer-implemented method of claim 1, wherein each client within the plurality of clients connects to the Internet from a different Internet Protocol address block.

3. The computer-implemented method of claim 1, wherein using the client as a proxy comprises:
   receiving a communication from the client to initiate a tunneling protocol;
   communicating with the client via the tunneling protocol.

4. The computer-implemented method of claim 1, wherein using the client as a proxy comprises communicating with a proxy agent installed on the client as part of an endpoint security software installation on the client.

5. The computer-implemented method of claim 1, wherein using the client as a proxy comprises identifying a user-submitted agreement to allow a security vendor to use the client as a proxy for communications with Internet sites targeted for security assessments.

6. The computer-implemented method of claim 1, wherein selecting the client from the plurality of clients comprises selecting the client based on the public Internet Protocol address of the client.

7. The computer-implemented method of claim 6, wherein selecting the client based on the Internet Protocol address of the client comprises selecting the client to test the Internet site for a response differentiated by Internet Protocol addresses.

8. The computer-implemented method of claim 6, wherein selecting the client based on the Internet Protocol address of the client comprises selecting the client to prevent detection as a security vendor by the Internet site.

9. The computer-implemented method of claim 6, wherein selecting the client based on the Internet Protocol address of the client comprises selecting the client based on a geographical region of the client ascertainable by the Internet site.

10. A system for performing Internet site security analyses, the system comprising:
   an identification module programmed to:
      identify a plurality of clients, each client within the plurality of clients connecting to the Internet from a different public Internet Protocol address;
      identify a plurality of potentially malicious Internet sites targeted for a security assessment;
   a selection module programmed to, for each Internet site within the plurality of potentially malicious Internet sites, select at least one client from the plurality of clients to use as a proxy for communicating with the Internet site on behalf of a security assessor;
   a gathering module programmed to communicate with the Internet site, using the client as a proxy, to gather information for a security analysis of the Internet site so that the Internet site is unable to block and/or tailor requests from the security assessor based on an Internet Protocol address of the client;
   an analysis module programmed to perform the security analysis of the Internet site based at least in part on the gathered information;
   at least one hardware processor configured to execute the identification module, the selection module, the gathering module, and the analysis module.

11. The system of claim 10, wherein each client within the plurality of clients connects to the Internet from a different Internet Protocol address block.

12. The system of claim 10, wherein the gathering module is programmed to use the client as a proxy by:
   receiving a communication from the client to initiate a tunneling protocol;
   communicating with the client via the tunneling protocol.

13. The system of claim 10, wherein the gathering module is programmed to use the client as a proxy by communicating with a proxy agent installed on the client as part of an endpoint security software installation on the client.

14. The system of claim 10, wherein the gathering module is programmed to use the client as a proxy by identifying a user-submitted agreement to allow a security vendor to use the client as a proxy for communications with Internet sites targeted for security assessments.

15. The system of claim 10, wherein the selection module is programmed to select the client from the plurality of clients by selecting the client based on the public Internet Protocol address of the client.

16. The system of claim 15, wherein the selection module is programmed to select the client based on the Internet Protocol address of the client by selecting the client to test the Internet site for a response differentiated by Internet Protocol addresses.

17. The system of claim 15, wherein the selection module is programmed to select the client based on the Internet Protocol address of the client by selecting the client to prevent detection as a security vendor by the Internet site.

18. The system of claim 15, wherein the selection module is programmed to select the client based on the Internet Protocol address of the client by selecting the client based on a geographical region of the client ascertainable by the Internet site.

19. A non-transitory computer-readable-storage medium comprising one or more computer-executable instructions that, when executed by at least one processor of a computing device, cause the computing device to:
   identify a plurality of clients, each client within the plurality of clients connecting to the Internet from a different public Internet Protocol address;
   identify a plurality of potentially malicious Internet sites targeted for a security assessment;
   for each Internet site within the plurality of potentially malicious Internet sites:
      select at least one client from the plurality of clients to use as a proxy for communicating with the Internet site on behalf of a security assessor;
      communicate with the Internet site, using the client as a proxy, to gather information for a security analysis of the Internet site so that the Internet site is unable to block and/or tailor requests from the security assessor based on an Internet Protocol address of the client;
   perform the security analysis of the Internet site based at least in part on the gathered information.

20. The computer-readable-storage medium of claim 19, wherein each client within the plurality of clients connects to the Internet from a different Internet Protocol address block.

* * * * *

UNITED STATES PATENT AND TRADEMARK OFFICE
CERTIFICATE OF CORRECTION

| | | |
|---|---|---|
| PATENT NO. | : 9,161,249 B1 | Page 1 of 1 |
| APPLICATION NO. | : 13/177891 | |
| DATED | : October 13, 2015 | |
| INVENTOR(S) | : Corrado Leita and Marc Dacier | |

It is certified that error appears in the above-identified patent and that said Letters Patent is hereby corrected as shown below:

On the Title Page, at item (75), the Inventors should read:
Corrado Leita, Juan les Pins (FR); Marc Dacier, Mouans Sartoux (FR)

Signed and Sealed this
Ninth Day of August, 2016

Michelle K. Lee
*Director of the United States Patent and Trademark Office*